United States Patent
Choi

(10) Patent No.: US 12,311,998 B2
(45) Date of Patent: May 27, 2025

(54) STEERING CONTROL APPARATUS, STEERING ASSIST APPARATUS AND STEERING SYSTEM

(71) Applicant: HL MANDO CORPORATION, Gyeonggi-do (KR)

(72) Inventor: Dae Geun Choi, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 862 days.

(21) Appl. No.: 17/317,653

(22) Filed: May 11, 2021

(65) Prior Publication Data
US 2021/0354744 A1 Nov. 18, 2021

(30) Foreign Application Priority Data
May 13, 2020 (KR) .......................... 10-2020-0056876

(51) Int. Cl.
| B62D 1/181 | (2006.01) |
| B60W 10/20 | (2006.01) |
| B62D 1/185 | (2006.01) |
| B62D 5/00 | (2006.01) |
| B62D 5/04 | (2006.01) |

(52) U.S. Cl.
CPC ............. B62D 1/181 (2013.01); B60W 10/20 (2013.01); B62D 1/185 (2013.01); B62D 5/006 (2013.01); B62D 5/0409 (2013.01); B62D 5/046 (2013.01); B62D 5/0463 (2013.01)

(58) Field of Classification Search
CPC ........ B62D 1/181; B62D 1/185; B62D 5/006; B62D 5/0409; B62D 5/046; B62D 5/0463; B60W 10/20

USPC .............................................. 180/443; 701/41
See application file for complete search history.

(56) References Cited

U.S. PATENT DOCUMENTS

| 2013/0126259 A1 | 5/2013 | Jung et al. |
| 2013/0131924 A1 | 5/2013 | Jung et al. |
| 2020/0028446 A1* | 1/2020 | Ghaderi ................... H02P 6/16 |
| 2023/0079227 A1* | 3/2023 | Suzuki ................ B62D 5/0406 |
| | | 701/41 |
| 2023/0198452 A1* | 6/2023 | Ohashi ...................... H02P 6/10 |
| | | 318/400.02 |

FOREIGN PATENT DOCUMENTS

| JP | 2012-170275 | 9/2012 |
| JP | 2021-178544 | 11/2021 |

(Continued)

OTHER PUBLICATIONS

Notice of Allowance dated Dec. 19, 2024 for Korean Patent Application No. 10-2020-0056876 and its English translation provided by Applicant's foreign counsel.

*Primary Examiner* — Christopher B Wehrly
(74) *Attorney, Agent, or Firm* — WOMBLE BOND DICKINSON (US) LLP

(57) ABSTRACT

The present embodiments relate to a steering control device, a steering assist device, and a steering system. A steering control device comprises an input-side steering control module controlling an input-side steering motor to assist an input-side mechanism mechanically separated from an output-side mechanism connected with a wheel and connected with a steering wheel. The input-side steering control module may control the input-side steering motor and the telescopic motor.

20 Claims, 14 Drawing Sheets

(56) References Cited

FOREIGN PATENT DOCUMENTS

| | | |
|---|---|---|
| KR | 10-2012-0127948 | 11/2012 |
| KR | 10-2013-0055859 | 5/2013 |
| KR | 10-2013-0056118 | 5/2013 |

* cited by examiner

STEERING CONTROL APPARATUS, STEERING ASSIST APPARATUS AND STEERING SYSTEM

CROSS-REFERENCE TO RELATED APPLICATION

This application claims priority from Korean Patent Application No. 10-2020-0056876, filed on May 13, 2020, which is hereby incorporated by reference for all purposes as if fully set forth herein.

BACKGROUND

Field

The present embodiments relate to a steering control device, a steering assist device, and a steering system.

Description of Related Art

In general, steering system refers to a system in which the driver of a vehicle may change the steering angle of the wheels of a vehicle based on the steering force (or rotational force) applied to the steering wheel. Electromotive power steering systems, e.g., electric power steer (EPS), have been recently applied to vehicles to ensure stable steering by reducing the steering force of the steering wheel.

There is increasing demand for research and development for controlling the steering motor and telescopic motor in the steering system for autonomous vehicles.

BRIEF SUMMARY

According to an embodiment, there may be provided a steering control device capable of controlling a steering motor and a telescopic motor.

According to an embodiment, there may be provided a steering assist device capable of controlling a steering motor and a telescopic motor.

According to an embodiment, there may be provided a steering system capable of controlling a steering motor and a telescopic motor.

According to an embodiment, there may be provided a steering control device, comprising an input-side steering control module controlling an input-side steering motor to assist an input-side mechanism mechanically separated from an output-side mechanism connected with a wheel and connected with a steering wheel, the input-side steering control module comprising a controller unit generating a steering motor control signal and a telescopic motor control signal and a steering motor power source unit controlling the input-side steering motor based on the steering motor control signal and controlling a telescopic motor based on the telescopic motor control signal, wherein the steering motor power source unit includes a switch element driver generating a switch control signal based on the steering motor control signal, a first inverter generating a first assist current by converting electric energy according to the switch control signal and providing the first assist current to the input-side steering motor, and a second inverter generating a second assist current by converting the electric energy according to the telescopic motor control signal and providing the second assist current to the telescopic motor.

According to an embodiment, there may be provided a steering assist device, comprising an input-side steering motor located on an input-side mechanism, a telescopic motor located on the input-side mechanism, and an input-side steering control module controlling the input-side steering motor to assist the input-side mechanism mechanically separated from an output-side mechanism connected with a wheel and connected with a steering wheel, wherein the input-side steering control module includes a controller unit generating a steering motor control signal and a telescopic motor control signal and a steering motor power source unit controlling the input-side steering motor based on the steering motor control signal and controlling the telescopic motor based on the telescopic motor control signal, and wherein the steering motor power source unit includes a switch element driver generating a switch control signal based on the steering motor control signal, a first inverter generating a first assist current by converting electric energy according to the switch control signal and providing the first assist current to the input-side steering motor, and a second inverter generating a second assist current by converting the electric energy according to the telescopic motor control signal and providing the second assist current to the telescopic motor.

According to an embodiment, there may be provided a steering system, comprising a steering device including an output-side mechanism connected with a wheel and an input-side mechanism mechanically separated from the output-side mechanism and connected with a steering wheel and a steering assist device including an input-side steering motor located on the input-side mechanism, a telescopic motor located on the input-side mechanism, and an input-side steering control module controlling the input-side steering motor to assist the input-side mechanism, wherein the input-side steering control module includes a controller unit generating a steering motor control signal and a telescopic motor control signal and a steering motor power source unit controlling the input-side steering motor based on the steering motor control signal and controlling the telescopic motor based on the telescopic motor control signal, and wherein the steering motor power source unit includes a switch element driver generating a switch control signal based on the steering motor control signal, a first inverter generating a first assist current by converting electric energy according to the switch control signal and providing the first assist current to the input-side steering motor, and a second inverter generating a second assist current by converting the electric energy according to the telescopic motor control signal and providing the second assist current to the telescopic motor.

According to the embodiments, there may be provided a steering control device capable of controlling a steering motor and a telescopic motor.

According to the embodiments, there may be provided a steering assist device capable of controlling a steering motor and a telescopic motor.

According to the embodiments, there may be provided a steering system capable of controlling a steering motor and a telescopic motor.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
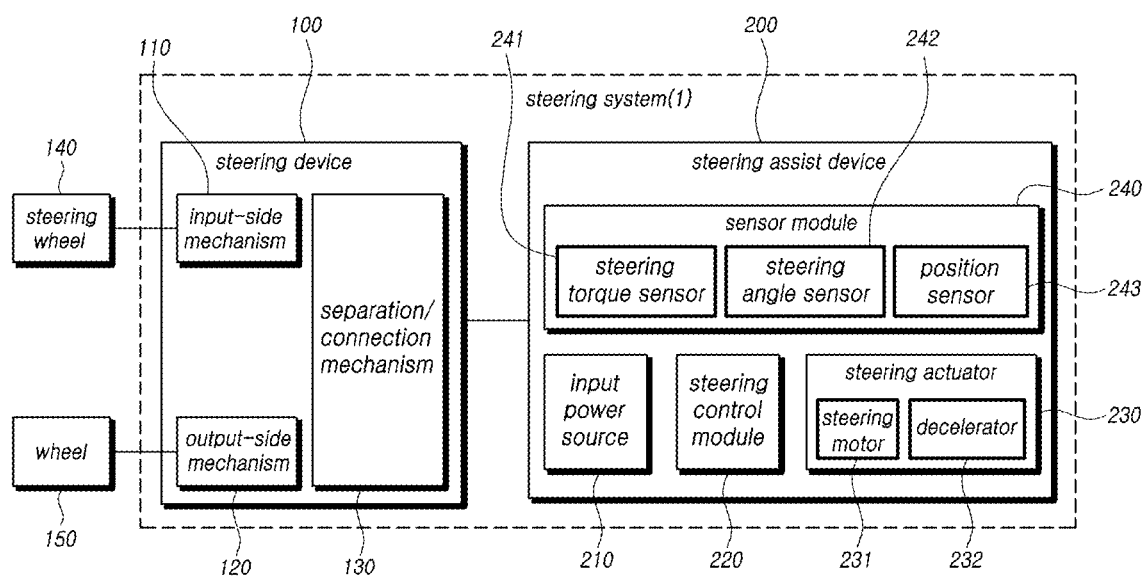
FIG. 1 is a block diagram illustrating an overall configuration of a steering system according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating an overall configuration of a steering system according to an embodiment.

Referring to FIG. 1, according to an embodiment, a steering system 1 may include at least one of a steering device 100 or a steering assist device 200. The steering device 100 and the steering assist device 200 may be connected by at least one of an electrical, magnetic, or mechanical connection.

There may be provided one or more steering devices 100. The steering device 100 may change the steering angle of a wheel 150 based on a steering force (or rotational force) applied to the steering wheel 140. The steering device 100 may include at least one of an input-side mechanism 110, an output-side mechanism 120, or a separation/connection mechanism 130. The input-side device 110, the output-side device 120, and the separation/connection device 130 may be connected by at least one of an electrical, magnetic, or mechanical connection.

There may be provided one or more input-side mechanisms 110. The input-side mechanism 110 may be connected to the steering wheel 140. The input-side mechanism 110 may rotate in a rotational direction of the steering wheel 140 or in a direction opposite to the rotational direction of the steering wheel 140. The input-side mechanism 110 may include a steering shaft connected to the steering wheel 140 but, without limitations thereto, may include any mechanism (or device) that may rotate in the rotational direction of the steering wheel or in the direction opposite to the rotational direction of the steering wheel.

There may be provided one or more output-side mechanisms 120. The output-side device 120 may be connected to the input-side device 110 by at least one of an electrical or mechanical connection. The output-side mechanism 120 may be connected to the wheel 150, changing the steering angle (or movement) of the wheel 150. The output-side mechanism 120 may include at least one of a pinion, a rack, a tie rod, or a knuckle arm but, without limitations thereto, may include any mechanism (or device) that may change the steering angle (or movement) of the wheel.

There may be provided one or more separation/connection mechanisms 130. The separation/connection mechanism 130 may be connected to the input-side mechanism 110 and the output-side mechanism 120. The separation/connection mechanism 130 may mechanically and/or electrically connect and/or separate the input-side device 110 and the output-side device 120. The separation/connection mechanism 130 may include a clutch but, without limitations thereto, may include any mechanism (or device) that may connect and/or separate the input-side mechanism and the output-side mechanism.

According to an embodiment, the steering device 100 may include at least one of a steering device in which an input-side mechanism and an output-side mechanism are connected mechanically, a steering device (e.g., steer by wire (SbW)) in which an input-side mechanism and an output-side mechanism are connected electrically, or a steering device (e.g., an SbW including a clutch) in which an input-side mechanism and an output-side mechanism are connected with a separation/connection mechanism.

There may be provided one or more steering wheels 140 or one or more wheels 150. The steering wheel 140 and the wheel 150 may be separately provided as illustrated in the drawings but, without limitations thereto, may be included in the steering device 100.

There may be provided one or more steering assist devices 200. The steering assist device 200 may be connected with the steering device 100. The steering assist device 200 may provide an assist steering force to the steering device 100.

According to an embodiment, the steering assist device 200 may include at least one of an input power source 210, a steering control module 220, a steering actuator 230, or a sensor module 240. The input power source 210, the steering control module 220, the steering actuator 230, and the sensor module 240 may be connected by at least one of an electrical, magnetic, or mechanical connection.

There may be provided one or more input power sources 210. The input power source 210 may include at least one of a direct current (DC) power source or an alternating current (AC) power source. In particular, the DC power source may include a battery but, without limitations thereto, may include any power source may provide DC power.

The sensor module 240 may include at least one sensor. Here, the sensor may include at least one of a steering torque sensor 241, a steering angle sensor 242, or a position sensor 243 but, without limitations thereto, may include any sensor capable of measuring the state of the vehicle and the steering state of the vehicle.

There may be provided one or more steering torque sensors 241. The steering torque sensor 241 may measure the steering torque of the steering wheel to obtain steering torque information for the steering wheel, and provide the torque information for the steering wheel to the steering control module 220. There may be provided one or more steering angle sensors 242. The steering angle sensor 242 may measure the steering angle of the steering wheel to obtain steering angle information for the steering wheel, and provide the steering angle information for the steering wheel to the steering control module 220. There may be provided one or more position sensors 243. The position sensor 243 may measure at least one of the position of the input-side mechanism, the position of the output-side mechanism, or the position of the steering motor to thereby obtain at least one of position information for the input-side mechanism, position information for the output-side mechanism, or position information for the steering motor and may provide at least one of the position information for the input-side mechanism, the position information for the output-side mechanism, or the position information for the steering motor to the steering control module 220.

The steering torque sensor 241, the steering angle sensor 242, and the position sensor 243 may be included in the sensor module as illustrated in the drawings but, without limitations thereto, may be included in at least one of the input-side mechanism 110, the output-side mechanism 120, the separation/connection mechanism 130, the steering wheel 140, the wheel 150, the input power source 210, the steering control module 220, or the steering actuator 230 (steering motor 231 or decelerator 232).

There may be provided one or more steering control modules 220. The steering control module 220 may be connected to the input power source 210. The steering control module 220 may receive electrical energy from the input power source 210 and filter noise of the electrical energy.

The steering control module 220 may generate a steering motor control signal based on information (e.g., at least one of the steering torque information, steering angle information, position information, or vehicle speed information) received from each component in the steering system 1 and/or the vehicle.

The steering control module 220 may convert the filtered electrical energy according to the steering motor control signal to thereby generate an assist steering force and control the steering actuator 230 (or steering motor 231) based on the assist steering force.

There may be provided one or more steering actuators 230. The steering actuator 230 may be connected with the steering control module 220. The steering actuator 230 may operate based on the assist steering force provided from the steering control module 220, assisting the steering device 100 in steering.

The steering actuator 230 may include at least one of the steering motor 231 or a decelerator 232. There may be provided one or more steering motors 231 or one or more decelerators 232. At least one of the steering motor 231 or the decelerator 232 may be connected with the steering control module 220.

If the steering actuator 230 includes the steering motor 231, the steering motor 231 may operate based on the assist steering force provided from the steering control module 220, assisting the steering device 100 in steering.

If the steering actuator 230 includes the steering motor 231 and the decelerator 232, the steering motor 231 may operate based on the assist steering force provided from the steering control module 220, and the decelerator 232 may operate according to the operation of the steering motor 231 to thereby assisting the steering device 100 in steering.

The steering motor 231 may include at least one of a single winding-type steering motor or a dual winding-type steering motor but, without limitations thereto, may include any motor that may assist the steering device in steering.

The steering motor 231 may include at least one of a single-phase type motor, a three-phase type motor, or a five-phase type motor but, without limitations thereto, may include any motor that may assist the steering device in steering.

The steering motor 231 may include at least one of a DC motor or an AC motor (e.g., a synchronous motor and/or an induction motor) but, without limitations thereto, may include any motor that may assist the steering device in steering.

Figure 2:
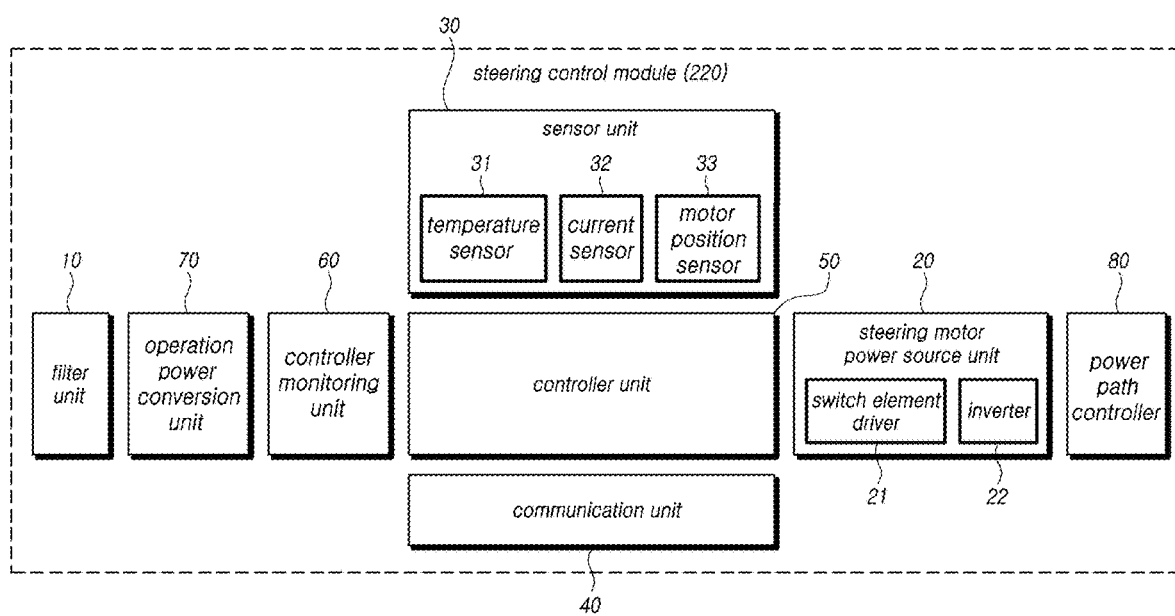
FIG. 2 is a block diagram illustrating a specific configuration of a steering control module according to an embodiment.

FIG. 2 is a block diagram illustrating a specific configuration of a steering control module according to an embodiment.

Referring to FIG. 2, according to an embodiment, the steering control module 220 may include at least one of a filter unit 10, a steering motor power source unit 20, a sensor unit 30, a communication unit 40, a controller unit 50, a controller monitoring unit 60, an operation power conversion unit 70, or a power path controller 80. The filter unit 10, the steering motor power source unit 20, the sensor unit 30, the communication unit 40, the controller unit 50, the controller monitoring unit 60, the operation power conversion unit 70, and the power path controller 80 may be connected by at least one of an electrical, magnetic, or mechanical connection.

There may be provided one or more filter units 10. The filter unit 10 may be connected to the input power source.

The filter unit 10 may filter noise of electric energy provided from the input power source and provide the filtered electric energy to the steering motor power source unit 20 and the operation power conversion unit 70.

There may be provided one or more steering motor power source units 20. The steering motor power source unit 20 may be connected with the filter unit 10 and may receive filtered electric energy from the filter unit 10. The steering motor power source unit 20 may be connected with the controller unit 50 and may receive a steering motor control signal from the controller unit 50. The steering motor power source unit 20 may generate an assist steering force by converting the filtered electric energy based on the steering motor control signal, and control the steering motor based on the assist steering force.

The steering motor power source unit 20 may include at least one of a switch element driver 21 or an inverter 22. There may be provided one or more switch element drivers 21 or one or more inverters 22. The switch element driver 21 and the inverter 22 may be connected by at least one of an electrical, magnetic, or mechanical connection.

The switch element driver 21 may receive the steering motor control signal from the controller unit 50, generate a switch element control signal based on the steering motor control signal, and provide the switch element control signal to the inverter 22. The inverter 22 may convert the filtered electrical energy of the filter unit according to the switch element control signal, generating an assist steering force.

The inverter 22 may include a switch and/or a transistor but, without limitations thereto, may include any element (or device) that may generate an assist steering force by converting the electrical energy according to the steering motor control signal and/or the switch element control signal.

If the inverter 22 includes a field effect transistor (FET), the switch element driver 21 may be a gate driver. Accordingly, the gate driver may receive the steering motor control signal from the controller unit 50, generate a gate control signal based on the steering motor control signal, and provide the gate control signal to the inverter 22. The inverter 22 may convert the filtered electrical energy of the filter unit according to the gate control signal, generating an assist steering force.

There may be provided one or more power path controllers 80. The power path controller 80 may be located between the steering motor power source unit 20 (or the inverter 22) and the steering actuator 230 (or the steering motor 231), supplying or cutting off the supply of the assist steering force received from the steering motor power source unit 20 (or the inverter) to the steering actuator 230 (or the steering motor 231).

The power path controller 80 may include at least one phase disconnector (PCO). The phase disconnector is an element or circuit capable of cutting off a phase, and may include at least one of a switch, a circuit breaker, a disconnecting switch, or a transistor but, without limitations thereto, may include any element and/or circuit that may cut off a phase.

The sensor unit 30 may include at least one of a temperature sensor 31, a current sensor 32, or a motor position sensor 33 but, without limitations thereto, may include any sensor that may measure the state of the steering system (or the steering control module). There may be provided one or more temperature sensors 31, one or more current sensors 32, or one or more motor position sensors 33. The temperature sensor 31 may measure the temperature of the steering control module 220 to thereby obtain temperature information, and provide the temperature information to the controller unit 50. The current sensor 32 may measure the assist current (or assist steering force) provided from the steering motor power source unit 20 to the steering actuator 230 (or the steering motor 231) to thereby obtain assist current information, and provide the assist current information to the controller unit 50. The motor position sensor 33 may measure the position of the steering motor to thereby obtain position information for the steering motor, and may provide the position information for the steering motor to the controller unit 50. The motor position sensor 33 may be included in the steering control module 220 but, without limitations thereto, may be provided separately.

There may be provided one or more communication units 40. The communication unit 40 may include at least one of an internal communication unit or an external communication unit. When there are a plurality of steering control modules, the internal communication unit may be connected with other steering control modules to receive or provide information. The external communication unit may be connected with the vehicle to receive vehicle state information (e.g., vehicle speed information) from the vehicle or provide information related to the steering system to the vehicle. There may be provided one or more controller units 50. The controller unit 50 may be connected with each component of the steering control module 220 to provide or receive information and, based thereupon, control the operation for each component of the steering control module 220.

For example, the controller unit 50 may generate a steering motor control signal based on at least one of the steering torque information for the steering wheel, steering angle information for the steering wheel, temperature information, assist current information, position information (position information for the input-side mechanism, position information for the output-side mechanism, and position information for the steering motor), vehicle state information (e.g., vehicle speed information), state information for the input power source, short circuit (or overcurrent) state information, current sensing information for the filter unit, or state information for the steering motor, and provide the steering motor control signal to the steering motor power source unit 20 (or switch element driver 21), or may generate a separation/connection control signal (e.g., a clutch control signal) and provide the separation/connection control signal to the separation/connection mechanism.

The controller unit 50 may include a microcontroller but, without limitations thereto, may include any device (or computer) that may process (or execute or compute) programs.

The controller monitoring unit 60 may be connected with the controller unit 50. The controller monitoring unit 60 may monitor the operating state of the controller unit 50. For example, the controller unit 50 may provide a watchdog signal to the controller monitoring unit 60. The controller monitoring unit 60 may be cleared based on the watchdog signal received from the controller unit 50 or may generate a reset signal and provide the reset signal to the controller unit 50.

The controller monitoring unit 60 may include a watchdog but, without limitations thereto, may include any device capable of monitoring the controller unit. In particular, a watchdog may include a window watchdog having a deadline, that is, a start and an end.

The operation power conversion unit 70 may be connected with the filter unit 10. The operation power conversion unit 70 may generate an operating voltage for each component of the steering control module 220 by converting the filtered electrical energy received from the filter unit 10.

The operation power conversion unit 70 may include at least one of a DC-DC converter or a regulator but, without limitations thereto, may include any device that may convert the filtered electrical energy to thereby generate an operating voltage for each component of the steering control module and/or for the outside of the steering control module.

The steering control module 220 may include an electronic control unit (ECU) but, without limitations thereto, may include any controller (or system) that may perform electronic control.

In the following description, for simplicity of description, the steering device 100 is a steer by wire (SbW) steering device, and the steering control module 220 includes an input-side steering control module. However, without limitations thereto, the following description may apply to any structure that may assist the steering device 100 via the steering control module 220.

Figure 3:
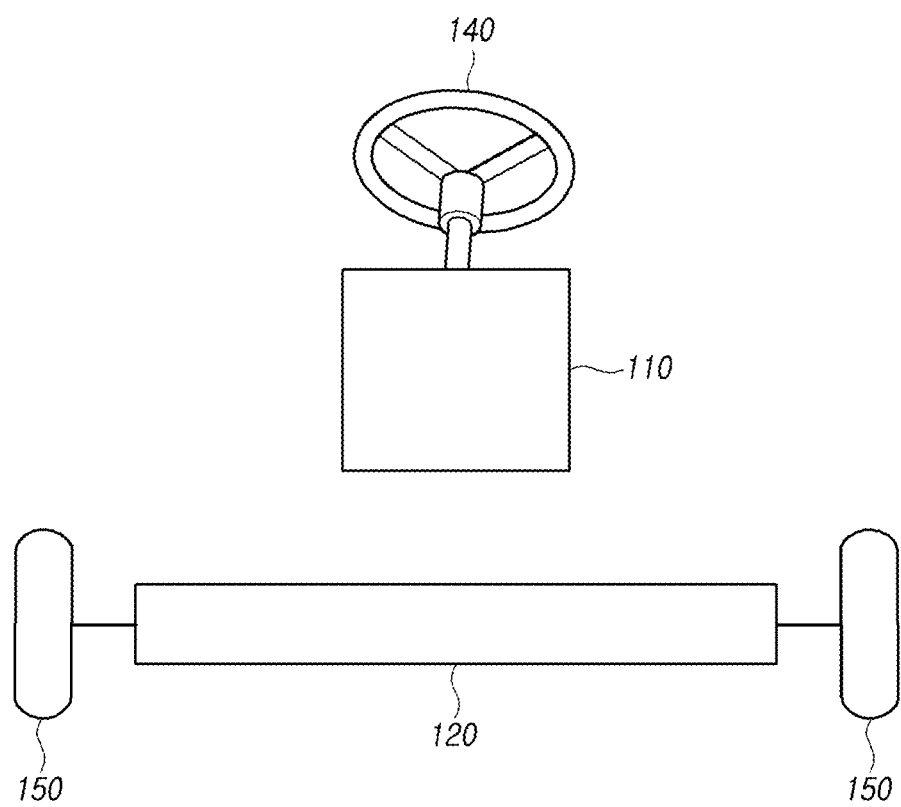
FIG. 3 is a view illustrating a steering device according to an embodiment.

FIG. 3 is a view illustrating a steering device according to an embodiment.

Referring to FIG. 3, according to an embodiment, a steering device 100 may include an input-side mechanism 110 connected with a steering wheel 140 and an output-side mechanism 120 mechanically separated from the input-side mechanism 110 and connected with a wheel 150. In other words, according to an embodiment, the steering device 100 may be a steer by wire (SbW) steering device.

The input-side mechanism 110 may rotate in a rotational direction of the steering wheel 140 or in a direction opposite to the rotational direction of the steering wheel 140, and may include, e.g., a steering shaft connected with the steering wheel 140. The output-side mechanism 120, which is mechanically separated from the input-side mechanism 110 and is electronically connected therewith, may be connected with the wheel 150, changing the steering angle (or movement) of the wheel. The input-side mechanism 110 may include at least one of a pinion, a rack, a tie rod, or a knuckle arm.

Figure 4:
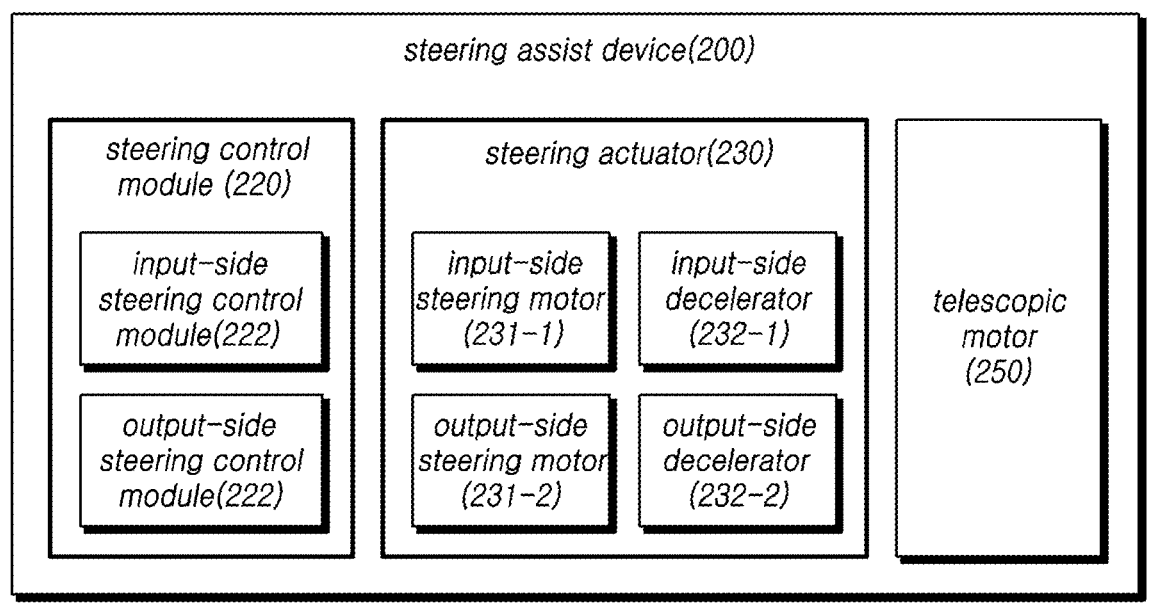
FIG. 4 is a block diagram illustrating a configuration of a steering assist device according to an embodiment.

FIG. 4 is a block diagram illustrating a configuration of a steering assist device according to an embodiment.

Referring to FIG. 4, according to an embodiment, a steering assist device may include at least one of a steering control module 220, a steering actuator 230, or a telescopic motor 250. The steering control module 220, the steering actuator 230, and the telescopic motor 250 may be connected by at least one of an electrical, magnetic, or mechanical connection. FIG. 4 illustrates only some features of the steering assist device but, without limitations thereto, any figures of the disclosure, related to the steering assist device, may be applied.

There may be provided one or more steering control modules 220. The steering control module may include at least one of an input-side steering control module 221 or an output-side steering control module 222. There may be provided one or more input-side steering control modules 221 or one or more output-side steering control modules 222.

The input-side steering control module 221 and the output-side steering control module 222 each may include at least one of the components of the steering control module 220 described above with reference to FIG. 2.

There may be provided one or more steering actuators 230. The steering actuator 230 may include at least one of the input-side steering actuator or the output-side steering actuator. There may be provided one or more input-side steering actuators or one or more output-side steering actuators.

In particular, the input-side steering actuator may include at least one of an input-side steering motor 231-1 or an input-side decelerator 232-1. There may be provided one or more input-side steering motors 231-1 or one or more input-side decelerators 232-1.

The output-side steering actuator may include at least one of an output-side steering motor 231-2 or an output-side decelerator 232-2. There may be provided one or more output-side steering motors 231-2 or one or more output-side decelerators 232-2.

There may be provided one or more telescopic motors 250. The telescopic motor 250 may include a DC motor but, without limitations thereto, may include any motor capable of moving the steering wheel in the direction of the steering shaft.

In particular, according to an embodiment, the input-side mechanism and the input-side steering assist device may be referred to as a steering feedback actuator (SFA), and the output-side mechanism and the output-side steering assist device may be referred to as a road wheel actuator (RWA). The input-side steering motor may be referred to as a reaction force motor, and the output-side steering motor may be referred to as a steering motor.

Figure 5:
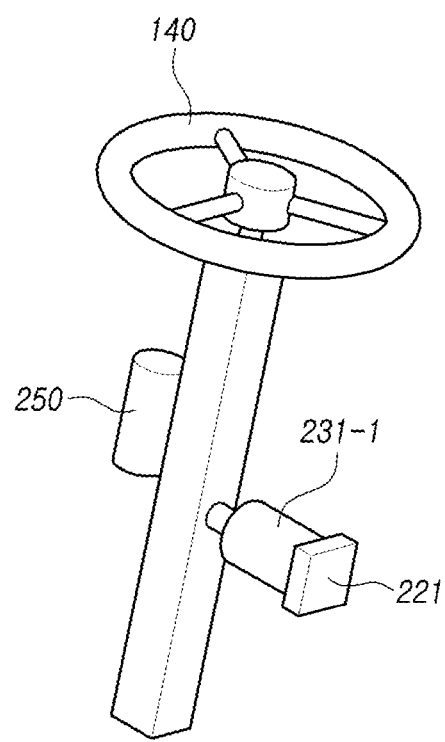
FIG. 5 is a view illustrating an input-side steering assist device according to an embodiment.

FIG. 5 is a view illustrating an input-side steering assist device according to an embodiment.

Referring to FIG. 5, an input-side steering assist device may include at least one of an input-side steering control module 221, an input-side steering motor 231-1, or a telescopic motor 250.

The input-side steering motor 231-1 and the telescopic motor 250 may be located on a steering shaft of the input-side mechanism. The input-side steering control module 221 may control the operation of the input-side steering motor 231-1 and the telescopic motor 250.

FIG. 5 illustrates only some features of the input-side steering assist device but, without limitations thereto, any figures of the disclosure, related to the input-side steering assist device, may be applied.

Figure 6:
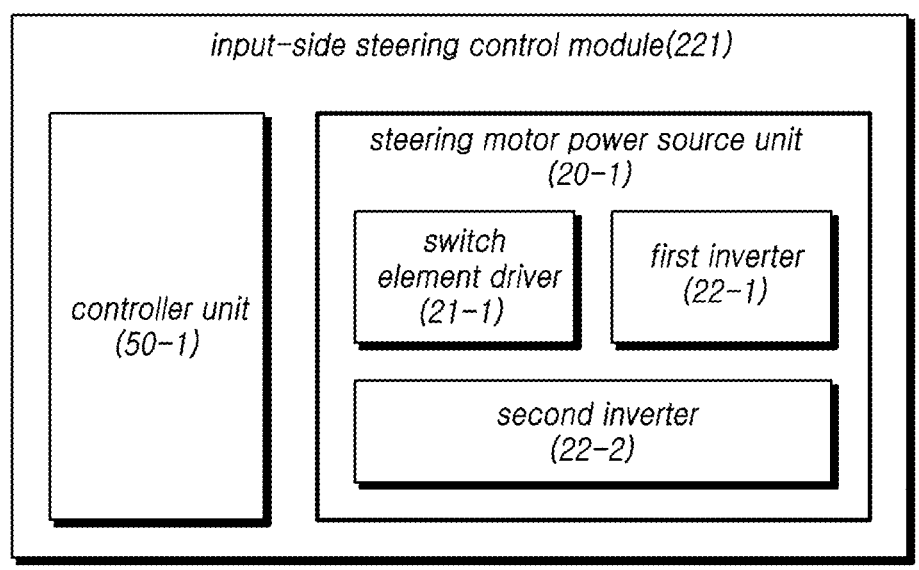
FIG. 6 is a block diagram illustrating a configuration of an input-side steering control module according to an embodiment.

FIG. 6 is a block diagram illustrating a configuration of an input-side steering control module according to an embodiment.

Referring to FIG. 6, according to an embodiment, an input-side steering control module 221 may include at least one of a controller unit 50-1 or a steering motor power source unit 20-1. The steering motor power source unit 20-1 may include at least one of a switch element driver 21-1, a first inverter 22-1, or a second inverter 22-2.

FIG. 6 illustrates only some features of the input-side steering control module but, without limitations thereto, any figures of the disclosure, related to the input-side steering control module, may be applied.

Referring to FIGS. 1 to 6, according to an embodiment, a steering system may include a steering device including an input-side mechanism 120 connected with a wheel and an input-side mechanism 110 mechanically separated from the input-side mechanism 120 and connected with a steering wheel 140, and a steering assist device including an input-side steering motor 231-1 located on the input-side mechanism 110, a telescopic motor 250 located on the input-side mechanism 110, and an input-side steering control module 221 controlling the input-side steering motor 231-1 to assist the input-side mechanism 110.

According to an embodiment, the steering assist device may include an input-side steering motor 231-1 located on the input-side mechanism 110, a telescopic motor 250 located on the input-side mechanism 110, and an input-side steering control module 221 controlling the input-side steering motor 231-1 to assist the input-side mechanism 110 which is mechanically separated from the output-side mechanism 120 connected with the wheel and connected with the steering wheel 140.

According to an embodiment, a steering control device may comprise an input-side steering control module 221 controlling an input-side steering motor 231-1 to assist an input-side mechanism 110 mechanically separated from an output-side mechanism 120 connected with a wheel and connected with a steering wheel. The input-side steering control module 221 may comprise a controller unit 50-1 generating a steering motor control signal and a telescopic motor control signal and a steering motor power source unit 20-1 controlling the input-side steering motor 231-1 based on the steering motor control signal and controlling a telescopic motor 250 based on the telescopic motor control signal. The steering motor power source unit 20-1 may include a switch element driver 21-1 generating a switch control signal based on the steering motor control signal, a first inverter 22-1 generating a first assist current by converting electric energy according to the switch control signal and providing the first assist current to the input-side steering motor 231-1 and a second inverter 22-2 generating a second assist current by converting the electric energy according to the telescopic motor control signal and providing the second assist current to the telescopic motor 250.

According to an embodiment, the steering control device may be understood as the same component as the steering control module 220 described above in connection with FIGS. 1 and 2.

According to an embodiment, to distinguish from the components included in the output-side steering control module 222, the components included in the input-side steering control module 221 may be described as the input-side controller unit, input-side steering motor power source unit, input-side switch element driver, input-side first inverter, and input-side second inverter but, for simplicity of description, the term "input-side" is omitted in the following description.

The input-side steering control module 221 is described in detail. The controller unit 50-1 may generate at least one control signal among a steering motor control signal and a telescopic motor control signal based on at least one of the steering torque information, steering angle information, or vehicle speed information obtained from the sensor module 240.

The controller unit 50-1 may generate at least one of a steering motor control signal or a telescopic motor control signal based on a driver input signal input by the driver.

There may be provided one or more steering motor control signals or one or more telescopic motor control signals.

The steering motor power source unit 20-1 may convert (or modulate) electrical energy received from the input power source based on the steering motor control signal, and control the input-side steering motor 231-1 based on the converted (or modulated) electrical energy.

The steering motor power source unit 20-1 may convert (or modulate) the electric energy received from the input power source 210 based on the telescopic motor control signal, and control the telescopic motor 250 based on the converted (or modulated) electrical signal.

The steering motor power source unit 20-1 may include a switch element driver 21-1, a first inverter 22-1, and a second inverter 22-2.

The switch element driver 21-1 and the first inverter 22-1 may control (or drive) the input-side steering motor 231-1.

In other words, the switch element driver 21-1 may receive the steering motor control signal from the controller unit 50-1 and generate a switch control signal based on the steering motor control signal. The first inverter 22-1 may receive a switch control signal from the switch element driver 21-1, convert (or modulate) electrical energy received from the input power source 210 based on the switch control signal to thereby generate a first assist current, and provide the first assist current to the input-side steering motor 231-1 to control driving of the input-side steering motor 231-1.

The second inverter 22-2 may control (or drive) the telescopic motor 250.

In other words, the second inverter 22-2 may receive a telescopic motor control signal from the controller unit 50-1, convert electrical energy received from the input power source 210 based on the telescopic motor control signal to thereby generate a second assist current, and provide the second assist current to the telescopic motor 250 to control driving of the telescopic motor 250.

The steering motor power source unit 20-1 may control the input-side steering motor 231-1 and the telescopic motor 250 at different times but, without limitations thereto, may simultaneously control the input-side steering motor 231-1 and the telescopic motor 250.

For example, the steering motor power source unit 20-1 may control the input-side steering motor 231-1 and the telescopic motor 250 simultaneously (e.g., at the same time) based on the steering motor control signal and the telescopic motor control signal.

The first inverter 22-1 may include a three-phase inverter. For example, the first inverter 22-1 may include a first high-side switch element and a first low-side switch element corresponding to phase A of the input-side steering motor 231-1, a second high-side switch element and a second low-side switch element corresponding to phase B of the input-side steering motor 231-1, and a third high-side switch element and a third low-side switch element corresponding to phase C of the input-side steering motor 231-1.

The second inverter 22-2 may include a two-phase inverter. For example, the second inverter 22-2 may include a fourth high-side switch element and a fourth low-side switch element corresponding to the plus (+) phase of the telescopic motor 250 and a fifth high-side switch element and a fifth low-side switch element corresponding to the minus (−) phase of the telescopic motor 250.

The switch element driver 21-1 may generate a switch control signal for controlling the first high-side switch element, the first low-side switch element, the second high-side switch element, the second low-side switch element, the third high-side switch element, and the third low-side switch element based on the steering motor control signal received from the controller unit 50-1.

The controller unit 50-1 may generate a telescopic motor control signal for controlling the fourth high-side switch element, the fourth low-side switch element, the fifth high-side switch element, and the fifth low-side switch element.

The input-side steering control module 221 may include a first input-side steering control module and a second input-side steering control module. The first input-side steering control module may be connected with, and control, the input-side steering motor and the telescopic motor. The second input-side steering control module may be connected with, and control, the input-side steering motor and the telescopic motor.

As an example, the first input-side steering control module may preferentially control the input-side steering motor 231 and telescopic motor and, if the first input-side steering control module changes into a faulty state, the control right may be transferred from the first input-side steering control module to the second input-side steering control module, so that the second input-side steering control module may control the input-side steering motor and telescopic motor on behalf of the first input-side steering control module.

As another example, the first input-side steering control module and the second input-side steering control module may control the input-side steering motor and telescopic motor and, if the first input-side steering control module changes into a faulty state, the second input-side steering control module may control the input-side steering motor and telescopic motor.

Figure 7:
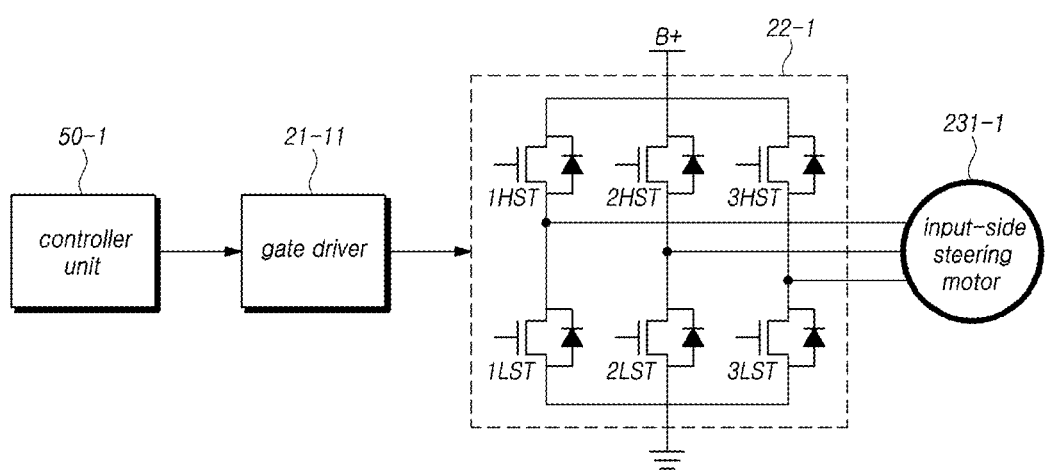
FIG. 7 is a view illustrating a method for controlling an input-side steering motor according to an embodiment.

FIG. 7 is a view illustrating a method for controlling an input-side steering motor according to an embodiment.

Referring to FIG. 7, according to an embodiment, an input-side steering control module 221 may include a controller unit 50-1, a switch element driver 21-1, and a first inverter 22-1. The switch element driver 21-1 may include a gate driver 21-11.

A first high-side switch element and a first low-side switch element corresponding to phase A of the input-side steering motor 231-1, a second high-side switch element and a second low-side switch element corresponding to phase B of the input-side steering motor 231-1, and a third high-side switch element and a third low-side switch element corresponding to phase C of the input-side steering motor 231-1, which are included in the first inverter 22-1, may include field effect transistors (FETs).

In other words, the first high-side switch element may be a first HS FET (1HST), the first low-side switch element may be a first LS FET (1LST), the second high-side switch element may be a second HS FET (2HST), the second low-side switch element may be a second LS FET (2LST), the third high-side switch element may be a third HS FET (3HST), and the third low-side switch element may be a third LS FET (3LST).

Accordingly, the controller unit 50-1 may generate first to sixth steering motor control signals. The gate driver may generate a first HS FET gate control signal based on the first steering motor control signal, a first LS FET gate control signal based on the second steering motor control signal, a second HS FET gate control signal based on the third steering motor control signal, a second LS FET gate control signal based on the fourth steering motor control signal, a third HS FET gate control signal based on the fifth steering motor control signal, and a third LS FET gate control signal based on the sixth steering motor control signal.

The first HS FET (1HST), the first LS FET (1LST), the second HS FET (2HST), the second LS FET (2LST), the third HS FET (3HST), and the third LS FET (3LST) of the first inverter 22-1 may be turned on or off by the first HS FET gate control signal, the first LS FET gate control signal, the second HS FET gate control signal, the second LS FET gate control signal, the third HS FET gate control signal, and the third LS FET gate control signal, respectively, and based thereupon, the battery power may be converted (or modulated) to generate a first assist current that may then be provided to the input-side steering motor 231-1.

FIGS. 8, 9, 10, and 11 are views illustrating a method for controlling a telescopic motor according to an embodiment.

Referring to FIGS. 8 to 11, according to an embodiment, an input-side steering control module 221 may include a controller unit 50-1 and a second inverter 22-2.

A fourth high-side switch element corresponding to the plus (+) phase of the telescopic motor 250 included in the second inverter 22-2 and a fifth high-side switch element corresponding to the minus (−) phase of the telescopic motor 250 may include a relay, and a fourth low-side switch element corresponding to the plus (+) phase of the telescopic motor 250 and a fifth low-side switch element corresponding to the minus (−) phase of the telescopic motor 250 may include a field effect transistor (FET).

In other words, the fourth high-side switch element may be a first relay R1, the fifth high-side switch element may be a second relay R2, the fourth low-side switch element may be a fourth LS FET (4LST), and the fifth low-side switch element may be a fifth LS FET (5LST).

Accordingly, the controller 50-1 may generate telescopic motor control signals including a first relay control signal, a second relay control signal, a fourth LS FET gate control signal, and a fifth LS FET gate control signal.

The first relay R1 of the second inverter 22-2, the second relay R2, the fourth LS FET (4LST), and the fifth LS FET (5LST) may be turned on or off by the first relay control signal, the second relay control signal, the fourth LS FET gate control signal, and the fifth LS FET gate control signal, respectively, and based thereupon, the battery power may be converted (or modulated) to generate a second assist current that may then be provided to the telescopic motor 250.

Figure 8:
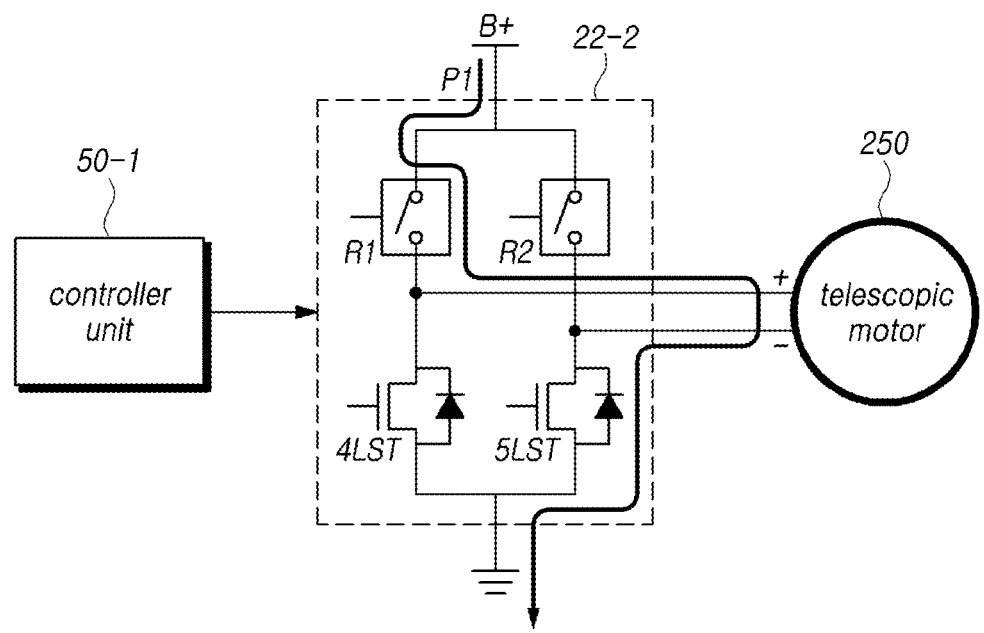
FIGS. 8, 9, 10, and 11 are views illustrating a method for controlling a telescopic motor according to an embodiment.
Figure 9:
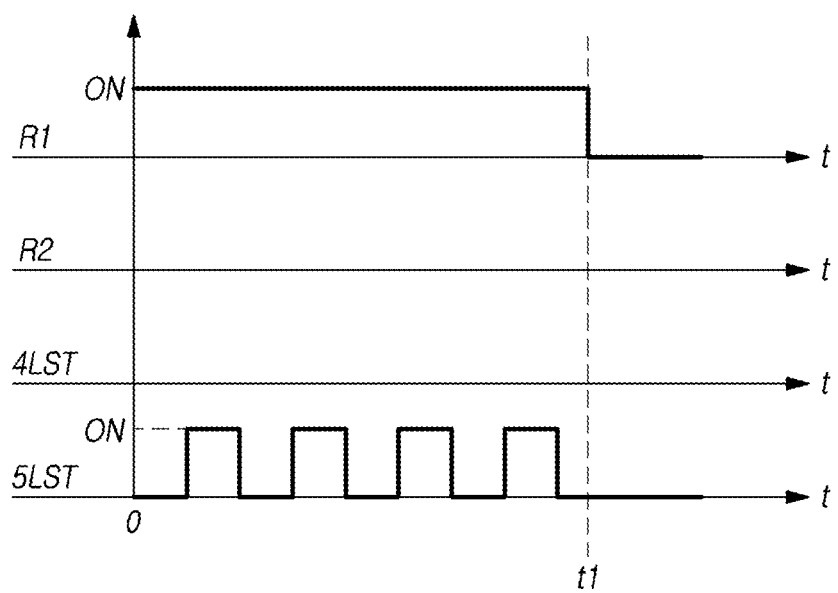

FIGS. 8 and 9 are views illustrating a method for controlling a telescopic motor to rotate in a forward direction according to an embodiment.

Referring to FIGS. 8 and 9, the controller unit 50-1 may turn on the first relay R1 based on the first relay control signal and, while the first relay R1 maintains the on state, turn on or off the fifth LS FET (5LST) based on the fifth LS FET gate control signal so as to allow the telescopic motor 250 to rotate in a forward direction.

In other words, during the period from 0 to t1, the first relay R1 may be turned on by the first relay control signal and maintain the on state, and the fifth LS FET (5LST) may be turned on or off by the fifth LS FET gate control signal generated through, e.g., PWM, and the battery power, the first relay R1, the telescopic motor 250, and the fifth LS FET (5LST) may form a first power path P1, rotating the telescopic motor 250 in the forward direction by the first assist current.

It is possible to adjust the speed of rotation of the telescopic motor 250 in the forward direction by adjusting the turn-on or turn-off (or the turn-on cycle) of the fifth LS FET (5LST) while the first relay R1 maintains the on state.

Figure 10:
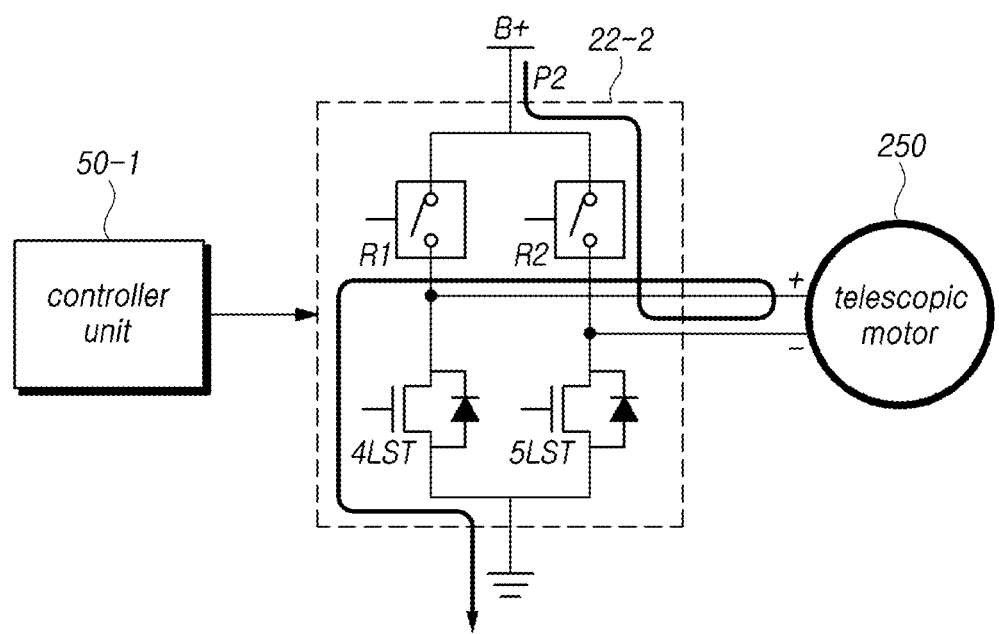
Figure 11:
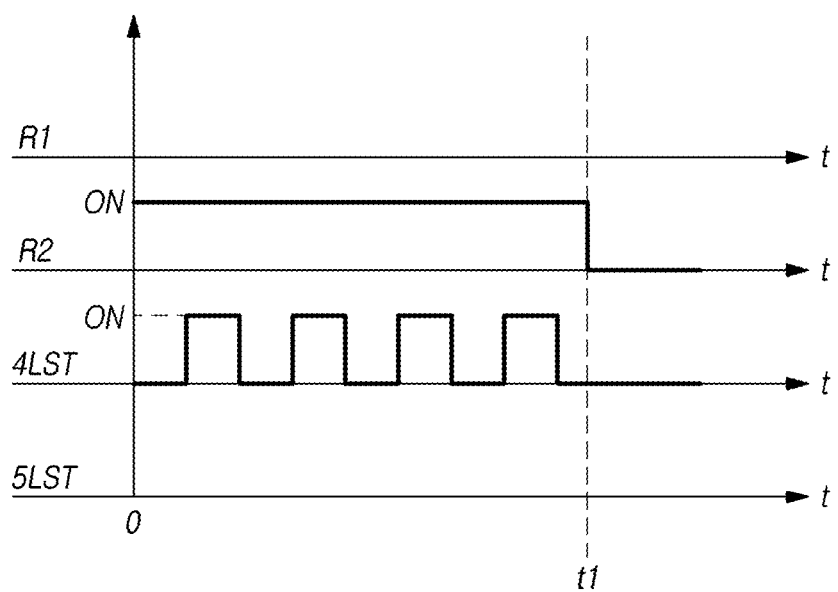

Referring to FIGS. 10 and 11, the controller unit 50-1 may turn on the second relay R2 based on the second relay control signal and, while the second relay R2 maintains the on state, turn on or off the fourth LS FET (4LST) based on the fourth LS FET gate control signal so as to allow the telescopic motor 250 to rotate in a reverse direction.

In other words, during the period from 0 to t1, the second relay R2 may be turned on by the second relay control signal and maintain the on state, and the fourth LS FET (4LST) may be turned on or off by the fourth LS FET gate control signal generated through, e.g., PWM, and the battery power, the second relay R2, the telescopic motor 250, and the fourth LS FET (4LST) may form a second power path P2, rotating the telescopic motor 250 in the reverse direction by the second assist current.

It is possible to adjust the speed of rotation of the telescopic motor 250 in the reverse direction by adjusting the turn-on or turn-off (or the turn-on cycle) of the fourth LS FET (4LST) while the second relay R2 maintains the on state.

As described above, according to an embodiment, the steering control device may apply a relay to the high side of the inverter (or the second inverter) driving the telescopic motor and apply an FET to the low side, controlling the driving of the telescopic motor only with a controller without a separate gate driver.

Figure 12:
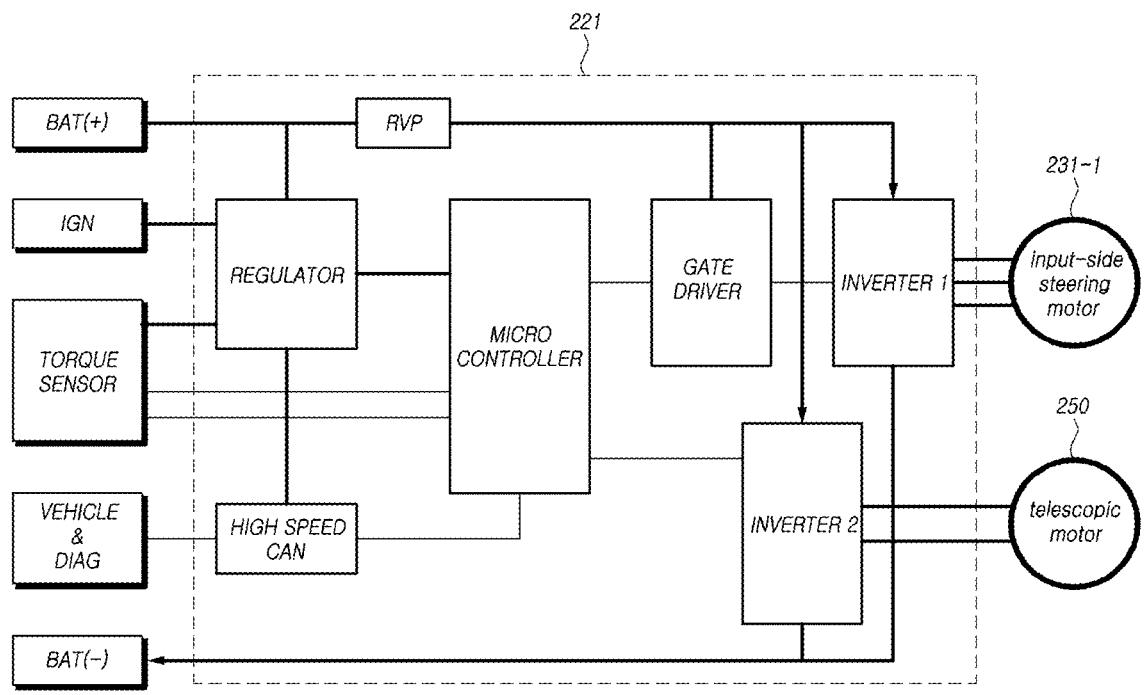
FIG. 12 is a view illustrating an SbW steering system according to an embodiment.

WM FIG. 12 is a view illustrating an SbW steering system according to an embodiment.

Referring to FIG. 12, according to an embodiment, an SbW steering system may include an input-side steering motor 231-1 for driving an EPS, a telescopic motor 250 for driving a telescopic steering device, and one input-side steering control module 221 for controlling them.

The input-side steering control module 221 may share a microcontroller (MICRO CONTROLLER) and a regulator (REGULATOR) for common purposes and have a first inverter (INVERTER 1) and a second inverter (IN-VERTER2) separately configured, simultaneously operating the input-side steering motor 231-1 and the telescopic motor 250.

The telescopic steering device is a device for moving the steering wheel forward/backward and is required to move the steering wheel to a desired position by quickly driving the telescopic motor in case of an emergency while the vehicle travels in automatic driving mode. In this case, if the voltage is insufficient, the telescopic motor may slow down. According to an embodiment, the SbW steering system may address such issue by connecting the second inverter for driving the telescopic motor to the input power source.

Reverse voltage protection (RVP) may prevent reverse voltage.

The regulator (REGULATOR) may provide an operating voltage to the components (e.g., the microcontroller (MICRO CONTROLLER) and HIGH SPEED CAN) included in the input-side steering control module 221 but, as illustrated, the regulator (REGULATOR) may also provide an operating voltage to components (e.g., IGN, or TORQUE SENSOR) outside the input-side steering control module.

The microcontroller (MICRO CONTROLLER) may receive steering torque information from a steering torque sensor (TORQUE SENSOR), and may also receive vehicle state information (e.g., vehicle speed information) from the vehicle through the HIGH SPEED CAN.

There may be provided one or more steering torque sensors (TORQUE SENSOR) that may provide a plurality of pieces of steering torque information.

A steering assist method according to an embodiment is described below with reference to the accompanying drawings. According to an embodiment, the steering assist method may be performed through the steering controller, the steering assist device, and the steering system. For simplicity of description, no duplicate description is given below of the steering control device, steering assist device, and steering system described above in connection with FIGS. 1 to 12.

Figure 13:
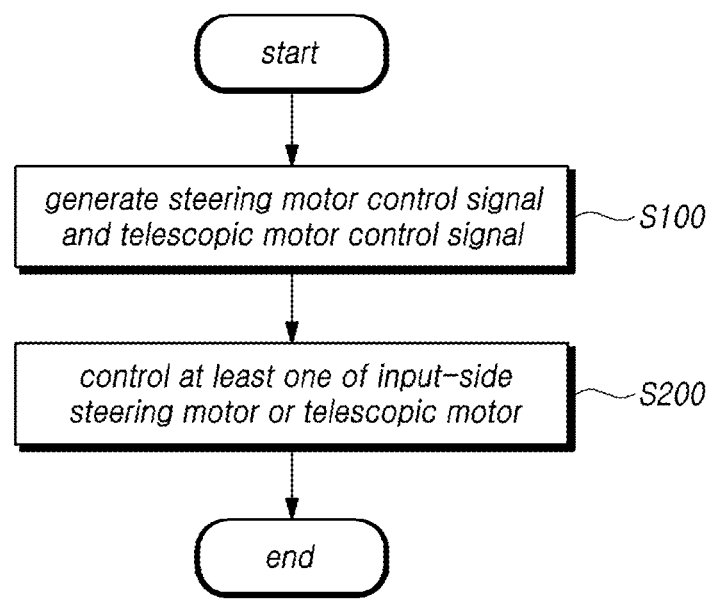
FIG. 13 is a flowchart illustrating a steering assist method according to an embodiment.

FIG. 13 is a flowchart illustrating a steering assist method according to an embodiment.

Referring to FIG. 13, according to an embodiment, a steering assist method may include the step S100 of generating a steering motor control signal and a telescopic motor control signal and at least one S200 of the step of controlling the input-side steering motor based on the steering motor control signal or the step of controlling the telescopic motor based on the telescopic motor control signal.

For example, according to an embodiment, a steering assist method may be performed through an input-side steering control module that controls an input-side steering motor to assist an input-side mechanism mechanically separated from an output-side mechanism connected with a wheel and connected with a steering wheel. The steering assist method may include the step S100 of generating a steering motor control signal and a telescopic motor control signal through a controller unit and the step S200 of controlling an input-side steering motor based on the steering motor control signal and a telescopic motor based on the telescopic motor control signal, through the steering motor power source unit.

Specifically, a steering motor control signal and a telescopic motor control signal may be generated through the controller unit (S100).

Thereafter, in step S200, a switch control signal may be generated based on the steering motor control signal through the switch element driver.

Then, electric energy may be converted through the first inverter according to the switch control signal to thereby generate a first assist current, and the first assist current may be provided to the input-side steering motor.

Next, electric energy may be converted through the second inverter according to the telescopic motor control signal to thereby generate a second assist current, and the second assist current may be provided to the telescopic motor.

Then, at least one of the input-side steering motor or the telescopic motor may be controlled (or driven).

For example, in step S200, the input-side steering motor and the telescopic motor may be simultaneously controlled (or driven) based on the steering motor control signal and the telescopic motor control signal.

The detailed methods for steps S100 and S200 described above are the same as those described above in connection with FIGS. 1 to 12 and, thus, no description thereof is presented below for simplicity of description.

As described above, according to an embodiment, the steering control device, the steering assist device, the steering system, and the steering assist method implement a controller structure in which the controller unit for driving the telescopic motor of the telescopic steering device is integrated with the controller unit of the EPS device, and the integrated controller may share, e.g., the MCU and the regulator, with changes made only to the motor driver, i.e., the steering motor power source unit. Thus, it is possible to reduce the size of the controller and simultaneously operate the EPS device and the telescopic steering device.

Figure 14:
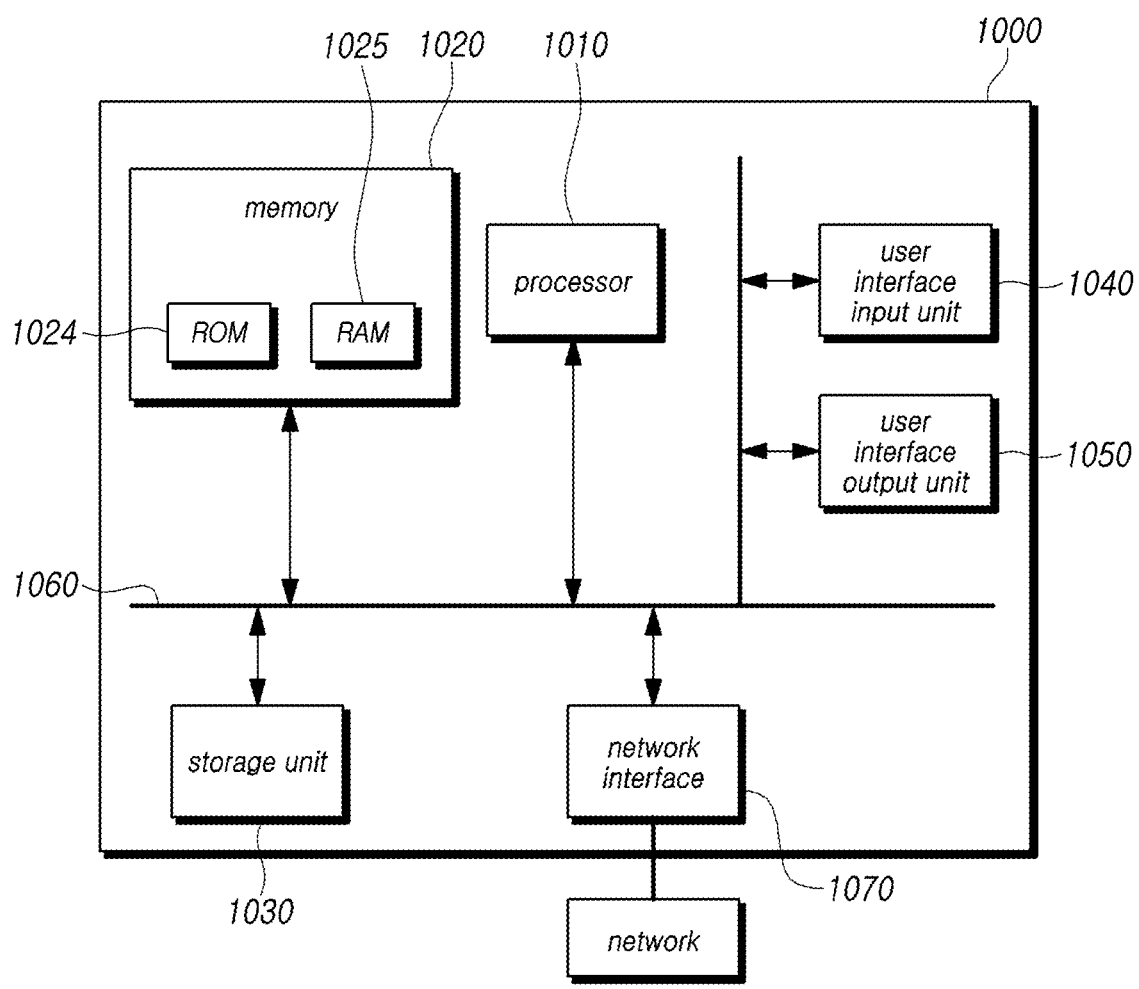
FIG. 14 is a block diagram illustrating a configuration of a computer system fora steering control device, a steering assist device, and a steering system according to an embodiment.

FIG. 14 is a block diagram illustrating a configuration of a computer system fora steering control device, a steering assist device, and a steering system according to an embodiment.

Referring to FIG. 14, the above-described embodiments may be implemented as, e.g., a computer-readable recording medium, in a computer system. As illustrated in the drawings, the computer system 1000 of the steering control device, steering assist device, and steering system may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as anon-volatile computer recording medium storing computer-implemented methods or computer executable instructions. The instructions may be executed by the processor to perform a method according to an embodiment of the disclosure. In particular, if the at least one core includes a plurality of cores, at least one of the plurality of cores may include a lockstep core.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering control device, comprising an input-side steering control module controlling an input-side steering motor to assist an input-side mechanism mechanically separated from an output-side mechanism connected with a wheel and connected with a steering wheel,
the input-side steering control module comprising:
a controller unit generating a steering motor control signal and a telescopic motor control signal; and
a steering motor power source unit controlling the input-side steering motor based on the steering motor control signal and controlling a telescopic motor based on the telescopic motor control signal, wherein
the steering motor power source unit includes:
a switch element driver generating a switch control signal based on the steering motor control signal;
a first inverter generating a first assist current by converting electric energy according to the switch control signal and providing the first assist current to the input-side steering motor; and
a second inverter generating a second assist current by converting the electric energy according to the telescopic motor control signal and providing the second assist current to the telescopic motor,
wherein the second inverter comprises a first relay as a high-side switch element corresponding to a plus (+) phase of the telescopic motor, a second relay as a high-side switch element corresponding to a minus (−) phase of the telescopic motor, a fourth FET (field effect transistor) as a low-side switch element corresponding to the plus (+) phase of the telescopic motor, and a fifth FET as a low-side switch element corresponding to the minus (−) phase of the telescopic motor, and
wherein the switch element driver is configured to control one of the fourth FET and the fifth FET of the second inverter to be turned-on and turned-off repeatedly by a FET gate control signal of PWM (pulse width modulation) while one of the first relay and the second relay of the second inverter is being controlled to maintain a turned-on state.

2. The steering control device of claim 1, wherein the steering motor power source unit simultaneously controls the input-side steering motor and the telescopic motor based on the steering motor control signal and the telescopic motor control signal.

3. The steering control device of claim 1, wherein
the first inverter includes a first high-side switch element and a first low-side switch element corresponding to phase A of the input-side steering motor, a second high-side switch element and a second low-side switch element corresponding to phase B of the input-side steering motor, and a third high-side switch element and a third low-side switch element corresponding to phase C of the input-side steering motor, and wherein
the switch element driver generates a switch control signal for controlling the first high-side switch element, the first low-side switch element, the second high-side switch element, the second low-side switch element, the third high-side switch element, and the third low-side switch element based on the steering motor control signal.

4. The steering control device of claim 3, wherein
the controller unit generates the telescopic motor control signal for controlling the first relay, the fourth FET, the second relay, and the fifth FET.

5. The steering control device of claim 4, wherein the first high-side switch element, the first low-side switch element, the second high-side switch element, the second low-side switch element, the third high-side switch element, and the third low-side switch element include a field effect transistor (FET), wherein
the switch element driver includes a gate driver.

6. The steering control device of claim 5, wherein
if a telescopic motor control signal controlling the first relay is a first relay control signal, a telescopic motor control signal controlling the fourth FET is a fourth LS FET gate control signal, a telescopic motor control signal controlling the second relay is a second relay control signal, and a telescopic motor control signal controlling the fifth FET is a fifth LS FET gate control signal, the controller unit turns on the first relay based on the first relay control signal and, while the first relay maintains an on state, turns on or off the fifth FET based on the fifth LS FET gate control signal so as to allow the telescopic motor to rotate in a forward direction.

7. The steering control device of claim 5, wherein
if a telescopic motor control signal controlling the first relay is a first relay control signal, a telescopic motor control signal controlling the fourth FET is a fourth LS FET gate control signal, a telescopic motor control signal controlling the second relay is a second relay control signal, and a telescopic motor control signal controlling the fifth FET is a fifth LS FET gate control signal, the controller unit turns on the second relay based on the second relay control signal and, while the second relay maintains an on state, turns on or off the fourth FET based on the fourth LS FET gate control signal so as to allow the telescopic motor to rotate in a reverse direction.

8. A steering assist device, comprising:
an input-side steering motor located on an input-side mechanism;
a telescopic motor located on the input-side mechanism; and
an input-side steering control module controlling the input-side steering motor to assist the input-side mechanism mechanically separated from an output-side mechanism connected with a wheel and connected with a steering wheel, wherein the input-side steering control module includes:

a controller unit generating a steering motor control signal and a telescopic motor control signal and a steering motor power source unit controlling the input-side steering motor based on the steering motor control signal and controlling the telescopic motor based on the telescopic motor control signal, and wherein the steering motor power source unit includes:

a switch element driver generating a switch control signal based on the steering motor control signal;

a first inverter generating a first assist current by converting electric energy according to the switch control signal and providing the first assist current to the input-side steering motor; and a second inverter generating a second assist current by converting the electric energy according to the telescopic motor control signal and providing the second assist current to the telescopic motor, wherein the second inverter comprises a first relay as a high-side switch element corresponding to a plus (+) phase of the telescopic motor, a second relay as a high-side switch element corresponding to a minus (−) phase of the telescopic motor, a fourth FET (field effect transistor) as a low-side switch element corresponding to the plus (+) phase of the telescopic motor, and a fifth FET as a low-side switch element corresponding to the minus (−) phase of the telescopic motor, and wherein the switch element driver is configured to control one of the fourth FET and the fifth FET of the second inverter to be turned-on and turned-off repeatedly by a FET gate control signal of PWM (pulse width modulation) while one of the first relay and the second relay of the second inverter is being controlled to maintain a turned-on state.

9. The steering assist device of claim 8, wherein the steering motor power source unit simultaneously controls the input-side steering motor and the telescopic motor based on the steering motor control signal and the telescopic motor control signal.

10. The steering assist device of claim 8, wherein the first inverter includes a first high-side switch element and a first low-side switch element corresponding to phase A of the input-side steering motor, a second high-side switch element and a second low-side switch element corresponding to phase B of the input-side steering motor, and a third high-side switch element and a third low-side switch element corresponding to phase C of the input-side steering motor, and wherein the switch element driver generates a switch control signal for controlling the first high-side switch element, the first low-side switch element, the second high-side switch element, the second low-side switch element, the third high-side switch element, and the third low-side switch element based on the steering motor control signal.

11. The steering assist device of claim 10, wherein the controller unit generates the telescopic motor control signal for controlling the first relay, the fourth FET, the second relay, and the fifth FET.

12. The steering assist device of claim 11, wherein the first high-side switch element, the first low-side switch element, the second high-side switch element, the second low-side switch element, the third high-side switch element, and the third low-side switch element include a field effect transistor (FET), wherein the switch element driver includes a gate driver.

13. The steering assist device of claim 12, wherein if a telescopic motor control signal controlling the first relay is a first relay control signal, a telescopic motor control signal controlling the fourth FET is a fourth LS FET gate control signal, a telescopic motor control signal controlling the second relay is a second relay control signal, and a telescopic motor control signal controlling the fifth FET is a fifth LS FET gate control signal, the controller unit turns on the first relay based on the first relay control signal and, while the first relay maintains an on state, turns on or off the fifth FET based on the fifth LS FET gate control signal so as to allow the telescopic motor to rotate in a forward direction.

14. The steering assist device of claim 12, wherein if a telescopic motor control signal controlling the first relay is a first relay control signal, a telescopic motor control signal controlling the fourth FET is a fourth LS FET gate control signal, a telescopic motor control signal controlling the second relay is a second relay control signal, and a telescopic motor control signal controlling the fifth FET is a fifth LS FET gate control signal, the controller unit turns on the second relay based on the second relay control signal and, while the second relay maintains an on state, turns on or off the fourth FET based on the fourth LS FET gate control signal so as to allow the telescopic motor to rotate in a reverse direction.

15. A steering system, comprising:

a steering device including an output-side mechanism connected with a wheel and an input-side mechanism mechanically separated from the output-side mechanism and connected with a steering wheel; and a steering assist device including an input-side steering motor located on the input-side mechanism, a telescopic motor located on the input-side mechanism, and an input-side steering control module controlling the input-side steering motor to assist the input-side mechanism, wherein the input-side steering control module includes:

a controller unit generating a steering motor control signal and a telescopic motor control signal and a steering motor power source unit controlling the input-side steering motor based on the steering motor control signal and controlling the telescopic motor based on the telescopic motor control signal, and wherein the steering motor power source unit includes:

a switch element driver generating a switch control signal based on the steering motor control signal;

a first inverter generating a first assist current by converting electric energy according to the switch control signal and providing the first assist current to the input-side steering motor; and a second inverter generating a second assist current by converting the electric energy according to the telescopic motor control signal and providing the second assist current to the telescopic motor, wherein the second inverter comprises a first relay as a high-side switch element corresponding to a plus (+) phase of the telescopic motor, a second relay as a high-side switch element corresponding to a minus (−) phase of the telescopic motor, a fourth FET (field effect transistor) as a low-side switch element corresponding to the plus (+) phase of the telescopic motor, and a fifth FET as a low-side switch element corresponding to the minus (−) phase of the telescopic motor, and wherein the switch element driver is configured to control one of the fourth FET and the fifth FET of the second inverter to be turned-on and turned-off repeatedly by a FET gate control signal of PWM (pulse width modulation) while one of the first relay and the second relay of the second inverter is being controlled to maintain a turned-on state.

16. The steering system of claim 15, wherein the first inverter includes a first high-side switch element and a first low-side switch element corresponding to phase A of the input-side steering motor, a second high-side switch element and a second low-side switch element corresponding to phase B of the input-side steering motor, and a third high-side switch element and a third low-side switch element corresponding to phase C of the input-side steering motor, and wherein the switch element driver generates a switch control signal for controlling the first high-side switch element, the first low-side switch element, the second high-side switch element, the second low-side switch element, the third high-side switch element, and the third low-side switch element based on the steering motor control signal.

17. The steering system of claim 16, wherein the controller unit generates the telescopic motor control signal for controlling the first relay, the fourth FET, the second relay, and the fifth FET.

18. The steering system of claim 17, wherein the first high-side switch element, the first low-side switch element, the second high-side switch element, the second low-side switch element, the third high-side switch element, and the third low-side switch element include a field effect transistor (FET), wherein the switch element driver includes a gate driver.

19. The steering system of claim 18, wherein if a telescopic motor control signal controlling the first relay is a first relay control signal, a telescopic motor control signal controlling the fourth FET is a fourth LS FET gate control signal, a telescopic motor control signal controlling the second relay is a second relay control signal, and a telescopic motor control signal controlling the fifth FET is a fifth LS FET gate control signal, the controller unit turns on the first relay based on the first relay control signal and, while the first relay maintains an on state, turns on or off the fifth FET based on the fifth LS FET gate control signal so as to allow the telescopic motor to rotate in a forward direction.

20. The steering system of claim 18, wherein if a telescopic motor control signal controlling the first relay is a first relay control signal, a telescopic motor control signal controlling the fourth FET is a fourth LS FET gate control signal, a telescopic motor control signal controlling the second relay is a second relay control signal, and a telescopic motor control signal controlling the fifth FET is a fifth LS FET gate control signal, the controller unit turns on the second relay based on the second relay control signal and, while the second relay maintains an on state, turns on or off the fourth FET based on the fourth LS FET gate control signal so as to allow the telescopic motor to rotate in a reverse direction.

* * * * *